(No Model.)
S. R. DRESSER.
PIPE COUPLING.
No. 400,644. Patented Apr. 2, 1889.
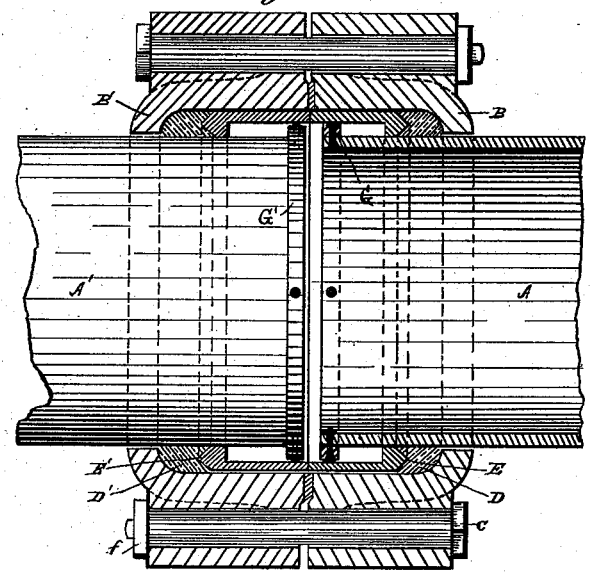
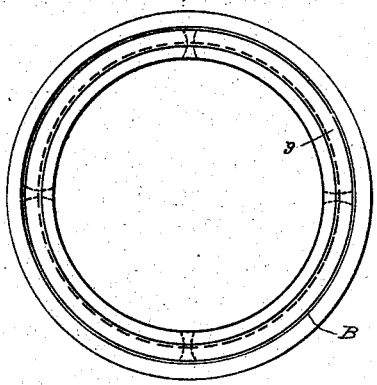
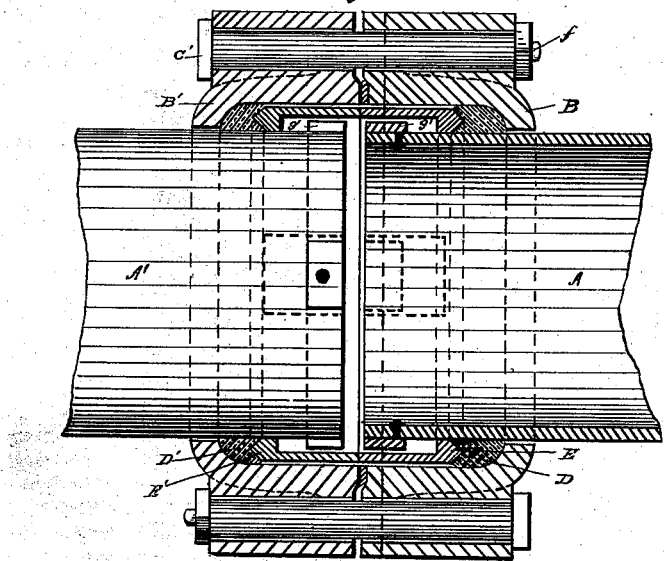
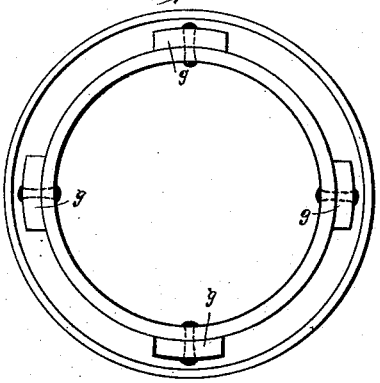
WITNESSES.
H. B. Hyatt.
S. J. Van Stavoren.
INVENTOR.
S. R. Dresser
per Hallock & Hallock
Attorneys.
N. PETERS, Photo-Lithographer, Washington, D. C.

UNITED STATES PATENT OFFICE.

SOLOMON R. DRESSER, OF BRADFORD, PENNSYLVANIA.

PIPE-COUPLING.

SPECIFICATION forming part of Letters Patent No. 400,644, dated April 2, 1889.

Application filed July 10, 1888. Serial No. 279,597. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

The object of my invention is to provide means to prevent pipes from pulling out of their connections when coupled together with a coupling made as shown in Fig. 2 of my patent, No. 381,916.

The nature of my invention consists of constructions and combinations, all as will hereinafter be described in the specification, and pointed out in the claims, reference being had to the accompanying drawings, in which—

Figure 1 represents a longitudinal section of the coupling; Fig. 2, a similar view of a modification of its construction shown in Fig. 1; Fig. 3, an end view of one of the pipes shown in Fig. 2, and Fig. 4 an end view of one of the pipes shown in Fig. 1.

A and A' are the pipes; B B', the sections of the coupling; D D', the packing-rings; E E', loose rings; C C, the clamping-bolts; f f, nuts for the bolts, and H a gasket between the sections B and B'.

In using the construction above described the pipes, owing to the fact that the parts B B', D D', and E E' have to fit snugly thereon, could not be provided with a fixed collar to prevent the pipe from slipping out of the joint; it would interfere with the placing of said parts upon the pipes. To overcome this defect, some retaining device must be provided to prevent the pipes slipping and at the same time not interfere with the placing of the parts of the joints upon the pipes.

The preferred retainer is a detachable ring, g g', secured to the periphery of the pipe. In the device shown in Fig. 2 detachable segments, g, of a circle or ring are used instead of the ring. To complete the joint, the parts B B' D D' E E' are slipped on their respective pipes a sufficient distance to permit of the attachment of the retainers g g' on the ends of pipes A and A', respectively.

The parts B B', D D', and E E' are then moved back into their proper place and the sections B and B' drawn together by means of the bolts and nuts until a tight joint is formed by compressing the packing-rings D D' between the parts B B' E E' and the gasket H between the sections B and B'. If either of the pipes should slip in the coupling, it can only move as far back as the shoulder d in the loose rings E E', which are recessed at d', so that pipes will have sufficient play. If it be desired to uncouple the pipe from the coupling, all that is necessary is to unloosen the sections B B', slip them and parts D D' E E' back, and remove the detainers from the ends of the pipes. The parts B B' D D' E E' can then be removed.

What I claim as new, and desire to secure by Letters Patent, is—

1. The combination of the pipes A and A', having detachable retainers on their ends, the coupling-sections B and B', made male and female for gasket H between said sections B and B', the loose rings, the packing-rings between coupling-sections and loose rings, and means for clamping the pipe-sections B and B' together, substantially as described.

2. The combination of the pipes A and A', having detachable retainers on their ends, the coupling-sections B and B', made male and female for gasket H between said sections B and B', the loose rings having shoulders and recesses d', the packing-rings, and means for clamping the parts together, substantially as described.

In testimony whereof I affix my signature in presence of two witnesses.

SOLOMON R. DRESSER.

Witnesses:
GEO. P. BOOTHE,
J. E. KIRK.